T. F. Hall, Traction Engine.

No. 104,845. Patented Jun 28 1870

Witnesses:
J. S. Mabee
Geo. W. Mabee

Inventor:
T. F. Hall
Per Munn
Attorneys.

United States Patent Office.

THOMAS F. HALL, OF OMAHA, NEBRASKA.

Letters Patent No. 104,845, dated June 28, 1870.

IMPROVEMENT IN TRACTION-ENGINE.

The Schedule referred to in these Letters Patent and making part of the same.

*To all whom it may concern:*

Be it known that I, THOMAS F. HALL, of Omaha, in the county of Douglas and State of Nebraska, have invented a new and improved Traction-Engine; and I do hereby declare that the following is a full, clear, and exact description thereof, which will enable others skilled in the art to make and use the same, reference being had to the accompanying drawing forming part of this specification.

Similar letters of reference indicate corresponding parts.

Figure 1:
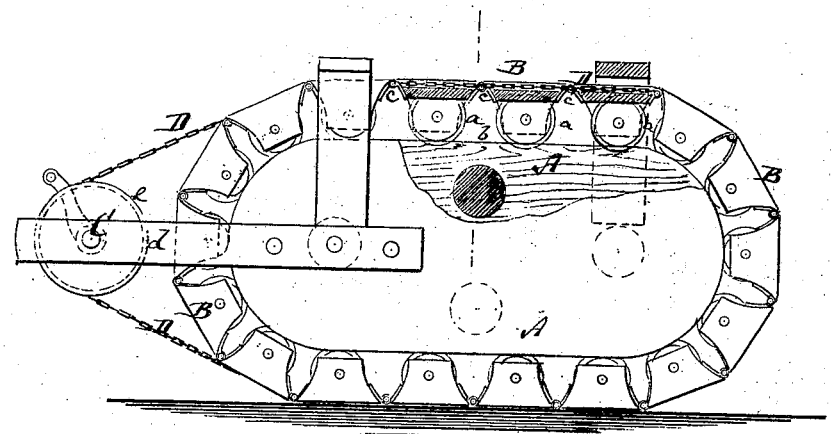
Figure 1 represents a side elevation, partly in section, of my improved traction-engine.

This invention relates to a new traction-engine, or construction of vehicle of that class in which an endless belt of traction-plates surrounds an inner frame, and travels around the same while propelling the entire apparatus.

The present invention consists in the application of an endless chain to the endless traction-belt, for transmitting motion to the same, as hereinafter more fully described.

A, in the drawing, represents the inner oval frame of my improved traction-engine.

B is the endless belt of transverse traction-plates surrounding the said frame.

Figure 2:
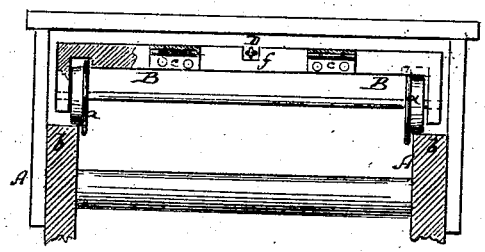
Figure 2 is a vertical transverse section of the same.

Each traction-plate of this belt is provided with friction-rollers, $a$ $a$, near each end on the inner side, and is by the same supported on the side rails $b$ $b$ of the frame A, as is clearly shown in fig. 2.

The several plates of the belt B, which extend entirely across the entire frame, are connected with each other by hinges, $c$, or equivalent joints.

In arms, $d$ $d$, that project forward or backward from the frame A, is hung a driving-shaft, C, which carries a pulley, $e$.

D is an endless chain, placed around the pulley $e$ and belt B, the several traction-plates of the latter being grooved, to receive the chain, as shown at $f$, fig. 2.

An engine and boiler may be supported on the upward-projecting portion of the frame A, to impart rotary motion to the shaft C, and thereby move the belt B, for propelling the apparatus.

The belt may be made of suitable length, in proportion with the required efficiency of the apparatus.

Having thus described my invention,

I claim as new and desire to secure by Letters Patent—

The endless traction-belt B fitted around the frame A, and combined with the shaft C and driving-chain D, substantially as herein shown and described.

THOMAS F. HALL.

Witnesses:
CHAS. HALL,
L. G. HEYBROOK.